Patented May 15, 1951

2,553,190

UNITED STATES PATENT OFFICE 2,553,190

METHOD FOR PRODUCTION OF FORMALDEHYDE CONDENSATION PRODUCTS OF MERCAPTO THIAZOLINES

Marion W. Harman, Nitro, W. Va., assignor to Monsanto Chemical Company, St. Louis, Mo., a corporation of Delaware No Drawing. Application February 23, 1949, Serial No. 78,007

2 Claims. (Cl. 260—303.1)

The present invention relates to new chemical compounds and to methods of making same.

The compounds of the present invention comprise reaction products of mercapto thiazolines with formaldehyde and ammonia. While mercapto thiazolines have been combined with formaldehyde and ammonia before, the compounds of this invention contain these reactants in a different ration than in the compounds heretofore produced. Thus the ammonium salt of 2-mercapto thiazoline is known to react with formaldehyde, presumably producing a compound of the structure

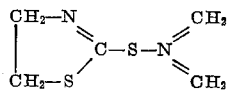

The new compounds are reaction products of mercapto thiazolines, formaldehyde, and ammonia containing three molecular proportions of mercapto thiazoline and three molecular proportions of formaldehyde combined with each molecular proportion of ammonia.

In accordance with this invention it has been found that mercapto thiazolines condense in aqueous medium with ammonia and formaldehyde, preferably in excess of the molecular proportion of the mercapto thiazoline, to produce valuable products. The reaction is conducted with the free mercapto thiazolines although it is preferable to add a small amount of alkali sufficient to render the charge slightly alkaline.

Typical examples of mercapto thiazolines which may be reacted with formaldehyde and ammonia comprise 2-mercapto thiazoline, 2-mercapto-4-methyl thiazoline, 2-mercapto-4,5-dimethyl thiazoline, 2-mercapto-5-methyl thiazoline, 2-mercapto-5-ethyl thiazoline, 2-mercapto-4,5-diethyl thiazoline, 2-mercapto-4-butyl thiazoline, 2-mercapto-4-benzyl thiazoline, 2-mercapto-4-phenethyl thiazoline, 2-mercapto-4-phenyl thiazoline, 2-mercapto-4-methoxy thiazoline, 2-mercapto-4-ethoxy thiazoline, 2-mercapto-4,5-tetramethylene thiazoline, and like mercapto thiazolines of the structural formula

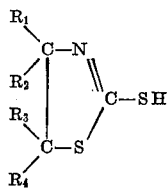

where $R_1$, $R_2$, $R_3$ and $R_4$ are members of the group consisting of hydrogen atoms, hydrocarbon, and alkoxy groups.

The new compounds of this invention contain a ratio of sulfur atoms to nitrogen atoms of 3:2 and are believed formed in accordance with the general equation $$3R-SH + 3HCHO + NH_3 \rightarrow (R-SCH_2)_3N + 3H_2O$$

where R represents a thiazoline radical. However, the present invention is not limited to any assumption as to chemical structure but pertains broadly to the condensation product obtained by condensing at least three molecular proportions of formaldehyde with three molecular proportions of a mercapto thiazoline and approximately one molecular proportion of ammonia wherein said condensation product possesses a ratio of sulfur atoms to nitrogen atoms of 3:2.

The reactions are best effected in aqueous mediums since organic solvents seem to favor the formation of by-products which do not contain the ratio of nitrogen to sulfur characteristic of the new compounds. The following example illustrates the preparation of one of the new compounds but is not limitative of the invention.

Example 1

71.4 parts by weight (substantially 0.6 molecular proportion) of 2-mercapto thiazoline was dispersed in an aqueous solution containing 36 parts by weight (substantially 1.2 molecular proportions) of formaldehyde and 2 parts by weight of soda ash. Thereafter with stirring was added 14 parts by weight (substantially 0.23 molecular proportion) of ammonium hydroxide (sp. gr. 0.9). The temperature of the mix was increased to 95° C. over a period of two hours and retained at that temperature for five hours more with constant agitation. A mixture of crystals and pellets developed and was separated by filtering the hot reaction mix. The residue was washed with dilute caustic and water and subsequently dried. A good yield was obtained. The crude product was then recrystallized from chlor benzene to give a while crystalline product having a melting point of 195°–197° C., which was slightly soluble or insoluble in alcohol, acetone, ethyl acetate, chloroform, and toluene. Analysis of the product gave a nitrogen and sulfur content respectively of 13.57% and 46.1%. The theoretical sulfur and nitrogen content of the condensation product, assuming it to be

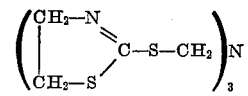

are respectively, 46.8% and 13.65%. Thus the product is believed to be formed in accordance with the equation

3R—SH+3HCHO+NH₃→ (R—S—CH₂)₃N+3H₂O where R is a thiazoline radical.

While a 1:1 molar ratio of formaldehyde to mercapto thiazoline in conjunction with ⅓ of a molecular proportion of ammonia may be employed to produce the above described product, it is preferable to use a 5:3, 2:1, or greater molar ratio of formaldehyde to mercapto thiazoline. The rate of the above described reaction may be appreciably increased by employing a temperature above 100° C. and at a pressure above atmospheric.

The above prepared complex condensation product is not to be confused with the reaction product of Mathes, U. S. Patent No. 2,338,864, who describes a product of the above described reactants having a melting point of 170° C. and containing sulfur atoms and nitrogen atoms in a ratio of 1:1.

As illustrative of the utility of these new compounds but again without limiting the invention, a synthetic rubber stock was compounded comprising

| Stock A, parts by weight | |
|---|---|
| Butadiene-1,3-styrene copolymer | 100 |
| Carbon black | 40 |
| Zinc oxide | 3 |
| Saturated hydrocarbon softener | 8 |
| Sulfur | 2 |
| Product of Example 1 having a M. P. of 195°–197° C. | 1 |

The stock so compounded was vulcanized in the usual manner by heating for 90 minutes in a press at 142° C.

*Table*

| | Modulus of Elasticity, in lbs./in.² at 300% Elongation | Tensile at Break, in lbs./in.² | Ult. Elong., Per Cent |
|---|---|---|---|
| Stock A | 930 | 3,050 | 650 |

The new products of this invention are useful for accelerating the vulcanization of rubber and for treating tire cord to improve the adhesion of cord to the rubber and for other uses.

The temperature and reaction times employed in the specific example have been found convenient but other temperatures and reaction times may be employed without departing from the spirit or scope of the invention.

What is claimed is:

1. The process which comprises heating three molecular proportions of a mercapto thiazoline of the structure

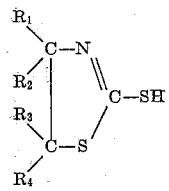

where R₁, R₂, R₃, and R₄ are members of the class consisting of hydrogen, hydrocarbon, and alkoxy groups, with at least three molecular proportions of formaldehyde and approximately one molecular proportion of ammonia in aqueous medium, producing a condensation product of said reactants which contains three molecular proportions of formaldehyde combined with three molecular proportions of said mercapto thiazoline, sulfur and nitrogen atoms in the ratio of 3:2, with the elimination of water as a by-product of the condensation.

2. The process which comprises heating three molecular proportions of mercapto thiazoline with at least three molecular proportions of formaldehyde and approximately one molecular proportion of ammonia in aqueous medium, producing a condensation product of said reactants reactants which contains three molecular proportions of formaldehyde combined with three molecular proportions of mercapto thiazoline, sulfur and nitrogen atoms in the ratio of 3:2, with the elimination of water as a by-product of the condensation.

MARION W. HARMAN.

REFERENCES CITED

The following references are of record in the file of this patent:

UNITED STATES PATENTS

| Number | Name | Date |
|---|---|---|
| 2,226,799 | Beaver | Dec. 31, 1940 |
| 2,470,555 | Harman | May 17, 1949 |